US009109788B2

(12) United States Patent
Dalsgaard et al.

(10) Patent No.: US 9,109,788 B2
(45) Date of Patent: Aug. 18, 2015

(54) BASE-YOKE CONNECTION FOR MOVING HEAD LIGHT FIXTURE

(71) Applicants: Carsten Dalsgaard, Silkeborg (DK); Lars Barslund Kjær, Hovedgård (DK); Aleksander Henrik Von Preyss, Lystrup (DK); Niels Jørgen Rasmussen, Egå (DK); Uffe Kjærsgaard Toft, Højbjerg (DK)

(72) Inventors: Carsten Dalsgaard, Silkeborg (DK); Lars Barslund Kjær, Hovedgård (DK); Aleksander Henrik Von Preyss, Lystrup (DK); Niels Jørgen Rasmussen, Egå (DK); Uffe Kjærsgaard Toft, Højbjerg (DK)

(73) Assignee: Martin Professional ApS, Aarhus N. (DK)

( * ) Notice: Subject to any disclaimer, the term of this patent is extended or adjusted under 35 U.S.C. 154(b) by 103 days.

(21) Appl. No.: 13/760,356

(22) Filed: Feb. 6, 2013

(65) Prior Publication Data
US 2013/0201686 A1   Aug. 8, 2013

(30) Foreign Application Priority Data

Feb. 6, 2012 (DK) .................................. 2012 70060
May 1, 2012 (DK) .................................. 2012 70223

(51) Int. Cl.
*F21V 21/26* (2006.01)
*F21V 21/14* (2006.01)
*F16M 11/08* (2006.01)
(Continued)

(52) U.S. Cl.
CPC ................ *F21V 21/14* (2013.01); *F16M 11/08* (2013.01); *F21V 21/30* (2013.01); *F21W 2131/406* (2013.01)

(58) Field of Classification Search
CPC ........ F21V 21/14; F21V 21/30; F16M 11/08; F21W 2131/406
USPC ......... 362/269, 271, 272, 275, 285, 286, 372, 362/386, 427, 428
See application file for complete search history.

(56) References Cited

U.S. PATENT DOCUMENTS

| 1,987,438 A | 1/1935 | French |
| 4,527,224 A * | 7/1985 | Sangiamo et al. ............ 362/269 |

(Continued)

FOREIGN PATENT DOCUMENTS

| CN | 201344492 Y | 11/1999 |
| CN | 201209834 | 3/2009 |

OTHER PUBLICATIONS

European Search Report; Search Report Date: Mar. 22, 2013; European Application No. EP13154159; 7 pages.
(Continued)

*Primary Examiner* — Y M Lee
(74) *Attorney, Agent, or Firm* — Blank Rome LLP

(57) ABSTRACT

The present invention relates to a moving head light fixture comprising:
  a base;
  a yoke connected to and rotatable relative to the base;
  a head connected to and rotatable relative to the yoke where the head comprises at least one light source generating a light.
The yoke and the base are connected through a rotating base-yoke mechanism comprising a main shaft, a hollow shaft surrounding the main shaft and at least one bearing separating the main shaft and a the hollow shaft. The main shaft has increasing cross sectional dimensions and comprises a first annular flange located a distance from the part of the main shaft having the largest cross sectional dimension and in that the cross sectional dimension of the first annular flange is smaller than the largest cross sectional dimension of the main shaft.

20 Claims, 11 Drawing Sheets

(51) Int. Cl.
*F21V 21/30* (2006.01)
*F21W 131/406* (2006.01)

(56) References Cited

U.S. PATENT DOCUMENTS

| | | | |
|---|---|---|---|
| 4,701,833 A | 10/1987 | Bornhorst | |
| 5,882,107 A | 3/1999 | Bornhorst et al. | |
| 6,964,503 B2 * | 11/2005 | Smith et al. | 362/371 |
| 2004/0070984 A1 | 4/2004 | Smith et al. | |

OTHER PUBLICATIONS

First Office Action; Danish Application No. PA201270223; Office Action dated: Dec. 12, 2012; 3 pages.

Danish Search Report; Danish Application No. PA201270223; Dated: Dec. 12, 2012; 1 page.

English Translation of Claims; Chinese Patent Application No. CN201344492; 1 page.

China Search Report dated May 21, 2014; corresponding China Application No. CN2013100473180; Filing Date: Feb. 6, 2013; 2 pages.

First Office Action dated Jun. 3, 2014; China Application No. CN2013100473180; Filing Date: Feb. 6, 2013; 4 pages.

Translation of First Office Action dated Jun. 3, 2014; China Application No. CN2013100473180; 1 page.

English abstract; China Publication No. CN201209834; 1 page; published Mar. 18, 2009; from China Application No. CN200820116960, filed May 22, 2008.

* cited by examiner

BASE-YOKE CONNECTION FOR MOVING HEAD LIGHT FIXTURE

RELATED APPLICATIONS

This application is claiming priority to Danish Patent Application No.: PA201270223 filed May 1, 2012 and Danish Patent Application No.: PA201270060 filed Feb. 6, 2012, which applications are incorporated herein by reference.

FIELD OF THE INVENTION

The present invention relates to mechanical parts of a moving head light fixture where the moving head light fixture comprises a head with a light source generating a light beam. The head is rotatable connected to a yoke, which yoke is rotatable connected to base. The present invention relates specifically to a base element for a moving head light fixture and to a base-yoke connection mechanism for a moving head light fixture.

BACKGROUND OF THE INVENTION

Moving head lighting fixtures are commonly known in the art of lighting and especially used in entertainment lighting. Typically a moving head light fixture comprises a head having a number of light sources which creates a light beam and number of light effect means adapted to create various light effects. The head is rotatable connected to a yoke and the yoke is rotatable connected to a base and the result is that the head can rotate and direct the light beam in many directions.

The competition in the market has traditionally been based on the optical performance of the moving head such as light output, number of light effects, color mixing etc. The competition in the market has lately changed such that parameters such as quality, serviceability and price have become the most important factors. There is thus a need for a competitive moving head lighting fixture with regard to quality, serviceability and price. Especially the base construction and base-yoke connection is relatively complex, expensive and complicated to manufacture.

DESCRIPTION OF THE INVENTION

The object of the present invention is to solve the above described limitations related to prior art. This is achieved moving head light fixture comprising a base-yoke mechanism as described in the independent claims. The dependent claims describe possible embodiments of the present invention. The advantages and benefits of the present invention are described in the detailed description of the invention.

DETAILED DESCRIPTION OF THE INVENTION

The present invention is described in view of a moving head lighting fixture including a discharge lamp generating a light beam, however the person skilled in the art realizes that any kind of light source such as discharge lamps, OLEDs, LED, plasma sources, halogen sources, fluorescent light sources, etc. can be used. Further the skilled person realizes that the present invention can be used in a various embodiments of moving head light fixtures.

Figure 1:
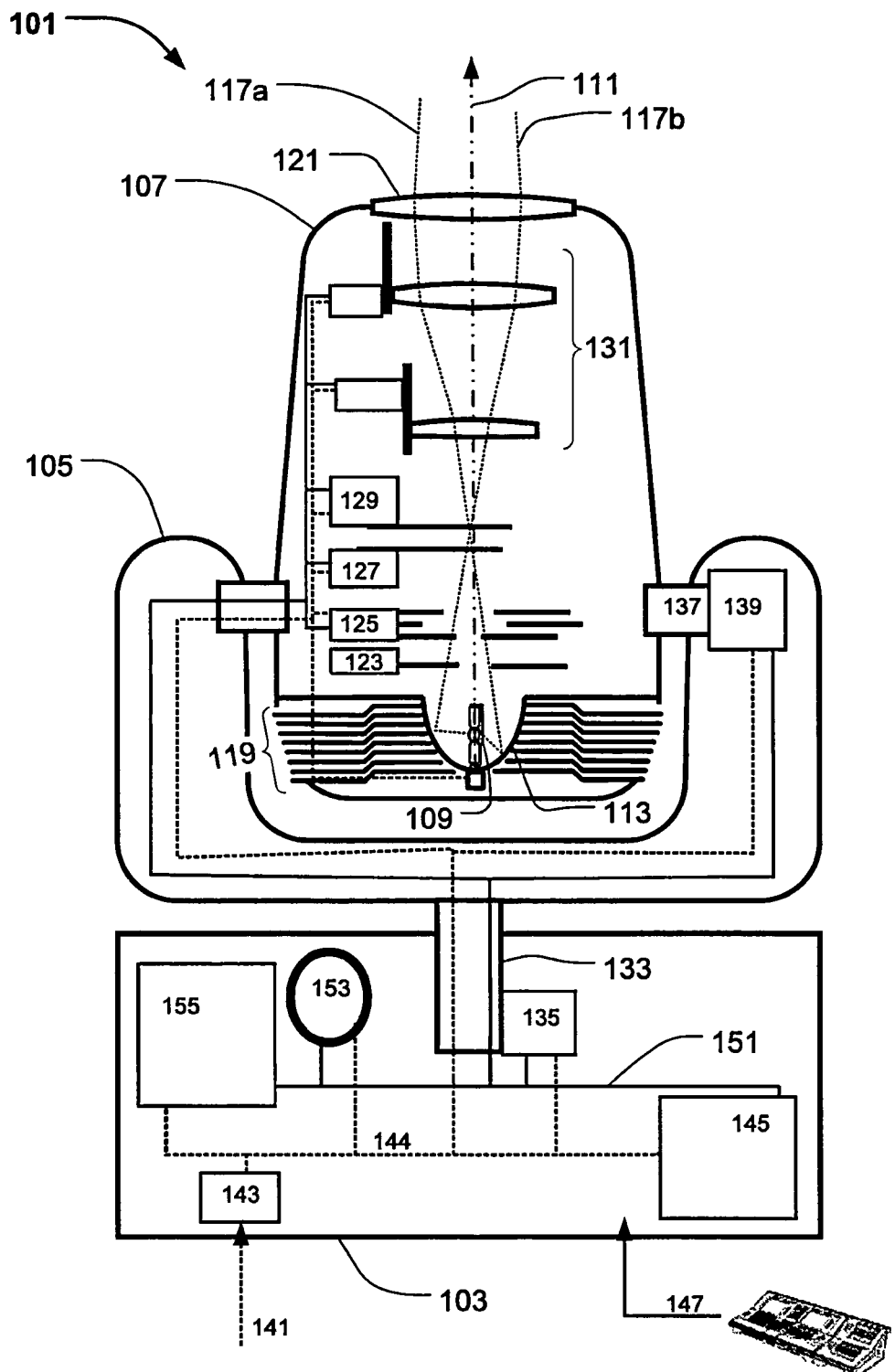
FIG. 1 illustrates a structural diagram of a moving head light fixture where the base element and base-yoke connection according to the present invention can be integrated.

FIG. 1 is a structural diagram illustrating a typical moving head light fixture according to prior art and wherein the present invention can be used. The moving head light fixture 101 comprises a base 103 rotatable connected to a yoke 105 and a head 107 rotatable carried in the yoke. The head comprises at least one light source 109 which generates a light beam propagating along an optical axis 111.

The light source 109 is arranged in a reflector 113 wherein the light source 109 is arranged. The reflector 113 is adapted to reflect a part of the light generated by the light source along the optical axis 111 as illustrated by dotted line 117a and 117b shows light rays, which are reflected by the main reflector before they propagate along the optical axis and through the rest of the optical system. It is noted the illustrated light rays only serve to illustrate the principles of the reflector and do not illustrate exact and precise light beams, further some light rays will also be directed directly along the optical axis from the light source. The person skilled in the art of optics will be able to design the shape of the reflector such the light leaving the reflector has a predetermined divergence, for instants in order to focus the light beams through an optical gate.

Typically the reflector is a dichroic ceramic reflector at least partially surrounded by a number of cooling fins 119. The dichroic ceramic reflector is adapted to transmit infrared light and reflect visible light in order to remove heat form the light. The infrared light will transmit through the ceramic dichroic reflector and hit the cooling fins 119 where infrared light are absorbed as heat which can be dissipated to the surroundings the cooling fins. The moving head light fixture can further be supplied with cooling means adapted to cool some of the components, for instance by using blowing means and cooling air.

The light is directed along the optical axis 111 by the reflector system and passes through a number of light effects before exiting the head through a front lens 121. The light effects can for instance be any light effects known in the art of intelligent lighting for instance a dimmer 123, a CMY color mixing system 125, color filters (not shown), gobos 127, animation effects 129, focus and zoom system 131, prism effects (not shown), framing effects (not shown), iris effects (not shown) or any other light effects known in the art.

The moving head light fixture comprises first rotating means for rotating the yoke in relation to the base, for instance by rotating a shaft 133 connected to the yoke by using a motor 135 positioned in the base or yoke (shown in base). The moving head light fixture comprises also second rotating means for rotating the head in relation to the yoke, for instance by rotating a shaft 137 connected to the head by using a motor 139 positioned in the yoke or head (shown in yoke). The skilled person knows that the rotation means can be constructed in many different ways using mechanical components such as motors, shafts, gears, cables, chains, transmission systems, bearings etc. However known prior art rotating means are rather complicated and thus difficult to manufacture. Especially the retirements for the first rotating means 133 connecting the base and yoke are complicated as the base-yoke rotating means must be able to take up many forces, when the yoke and head rotates in relation to the head. The moving head light fixture receives electrical power 141 from an external power supply (not shown). The electrical power is received by an internal power supply 143 which adapts and distributes electrical power through internal power lines 144 (dotted lines) to the subsystems of the moving head. The internal power system can be constructed in many different ways and the illustrated power lines is for simplicity illustrated as one system where all subsystems are connected to the same power line. The skilled person will however realize that some of the subsystems in the moving head need different kind of power and that a ground line also can be used. The light source will for instance in most applications need a different kind of power than step motors and driver circuits.

The light fixture comprises also a controller 145 which controls the other components (other subsystems) in the light fixture based on an input signal 147 indicative light effect parameters, position parameters and other parameters related to the moving head lighting fixture. The controller receives the input signal from a light controller 149 as known in the art of intelligent and entertainment lighting for instance by using a standard protocol like DMX, ArtNET, RDM etc. Typically the light effect parameter is indicative of at least one light effect parameter related to the different light effects in the light system. The controller 145 is adapted to send commands and instructions to the different subsystems of the moving head through internal communication lines 151 (solid lines). The internal communication system can be based on a various type of communications networks/systems and the illustrated communication system is just one illustrating example. The moving head can also comprise user input means enabling a user to interact directly with the moving head instead of using a light controller 149 to communicate with the moving head. The user input means 153 can for instance be bottoms, joysticks, touch pads, keyboard, mouse etc. The user input means can also be supported by a display 155 enabling the user to interact with the moving head through menu system shown on the display using the user input means 155. The display device and user input means can in one embodiment also be integrated as a touch screen.

Figure 2:
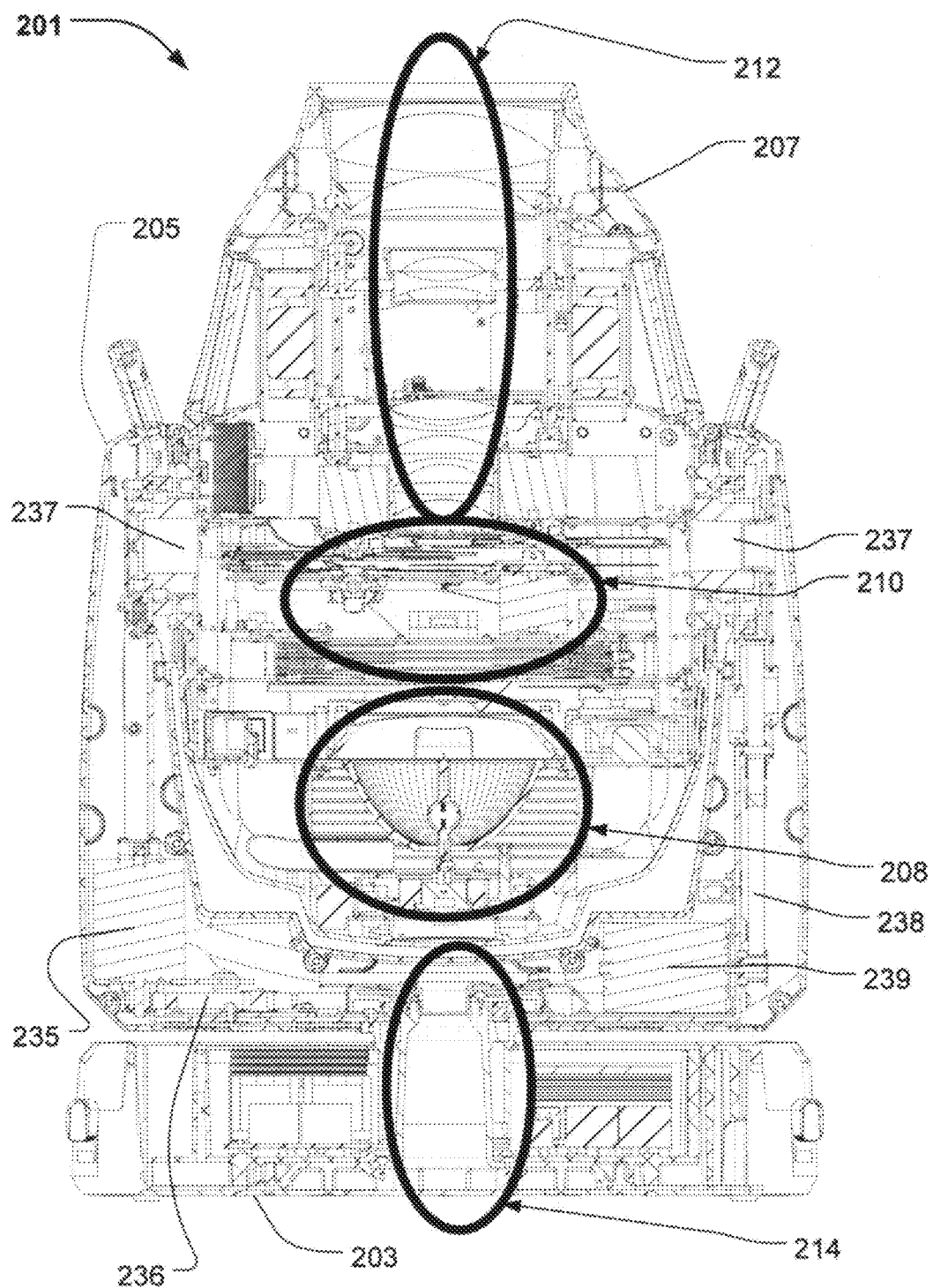
FIG. 2 illustrates a cross section of a moving head light fixture wherein the base element and base-yoke connection according to present invention have been integrated.

FIG. 2 is a cross sectional view of a moving head light fixture 201, comprising a base 203 rotatable connected to a yoke 205 and a head 207 rotatable carried in the yoke. The head comprises a reflecting and cooling system marked with circle 208 as for instance as described in the patent applications DK PA201270060 filed by the applicant 6 Feb. 2012 and DK PA2012 70221 filed by the applicant 1 May 2012. However the reflecting and cooling system can be embodied in any way as known in the art. Circle 210 indicated a number of light effects for instance as described in connection with FIG. 1. Circle 212 indicate a zoom and focus system comprising a number of optical lenses, which can be implemented as known in the art. The base 203 has been embodied as described below and as illustrated in FIG. 3a-3d and FIG. 4.

In this embodiment the first rotating means adapted to rotate the yoke 205 in relation the base 203 comprises a base-yoke connection as described below and as illustrated in FIG. 5 and FIG. 6a-6d. Circle 214 indicates the base-yoke connection. A pan motor 235 is arranged in the yoke and adapted to drive a drive wheel at the base-yoke connection through a drive belt 236, whereby the yoke rotates in relation to the base.

Further the second rotating means for rotating the head in relation to the yoke, comprises a tilt motor 239 arranged in the yoke and adapted to rotate a shaft 237 through a drive belt 238, whereby the head rotates in relation to the yoke.

Figure 3A:
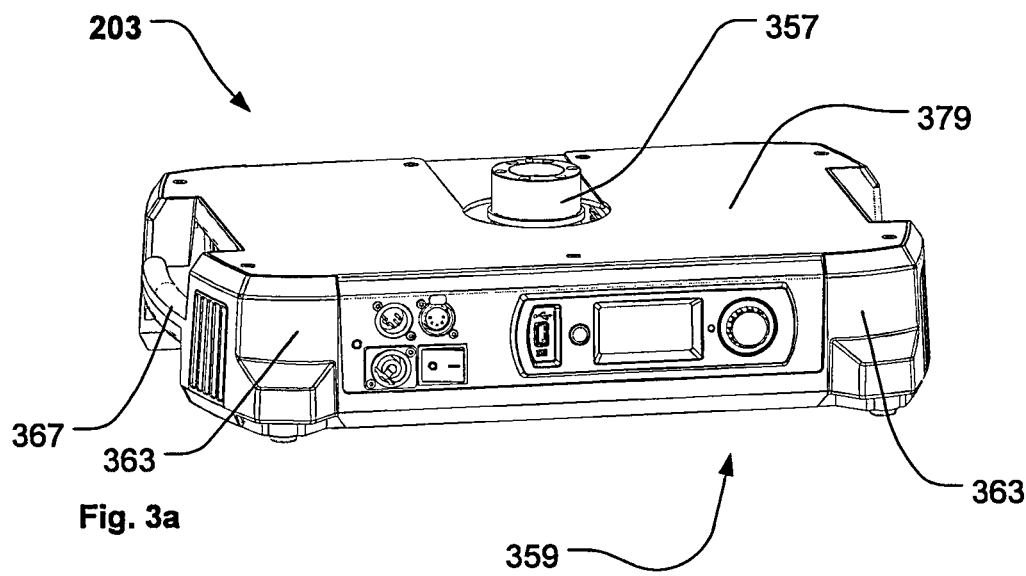
FIG. 3a-3d illustrates a base for a moving head light fixture and according to the present invention.
Figure 3B:
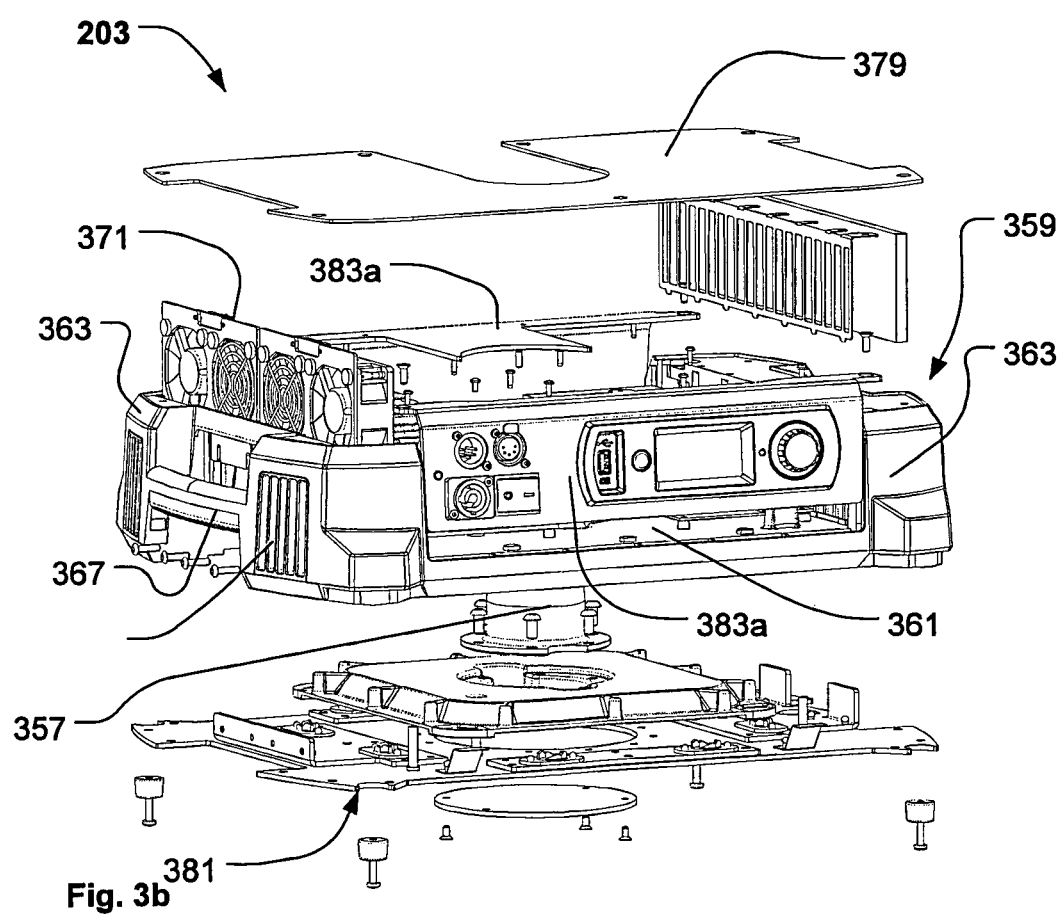
Figure 3C:
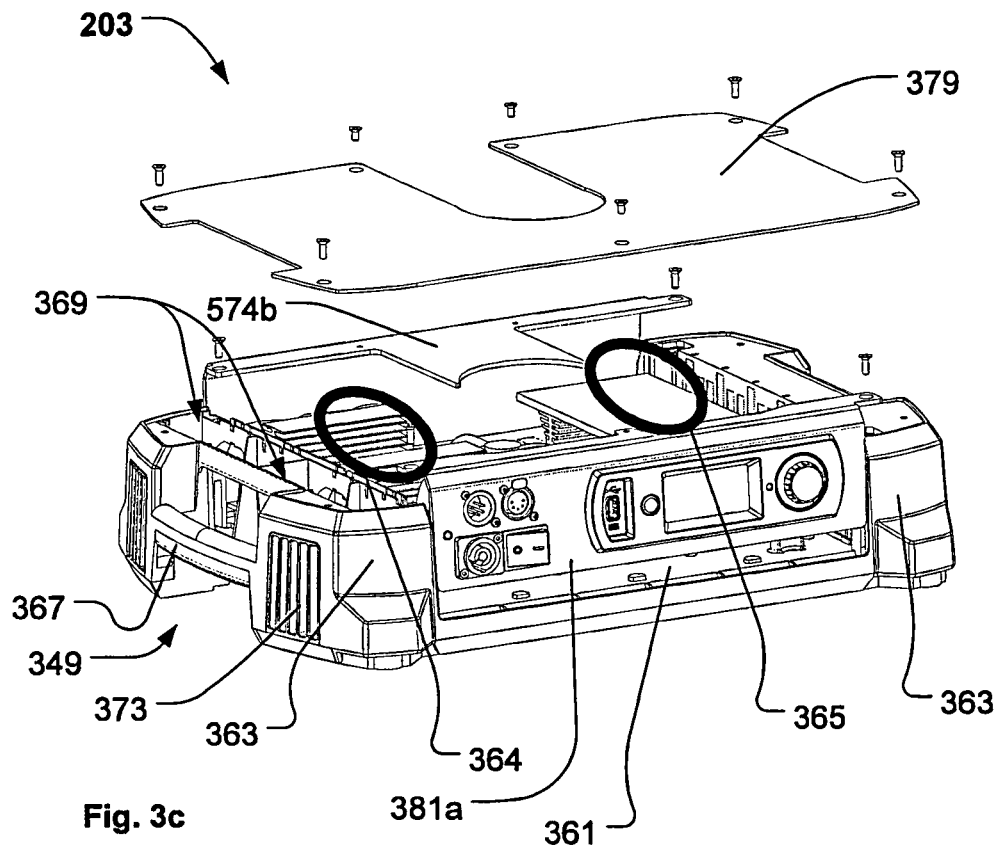
Figure 3D:
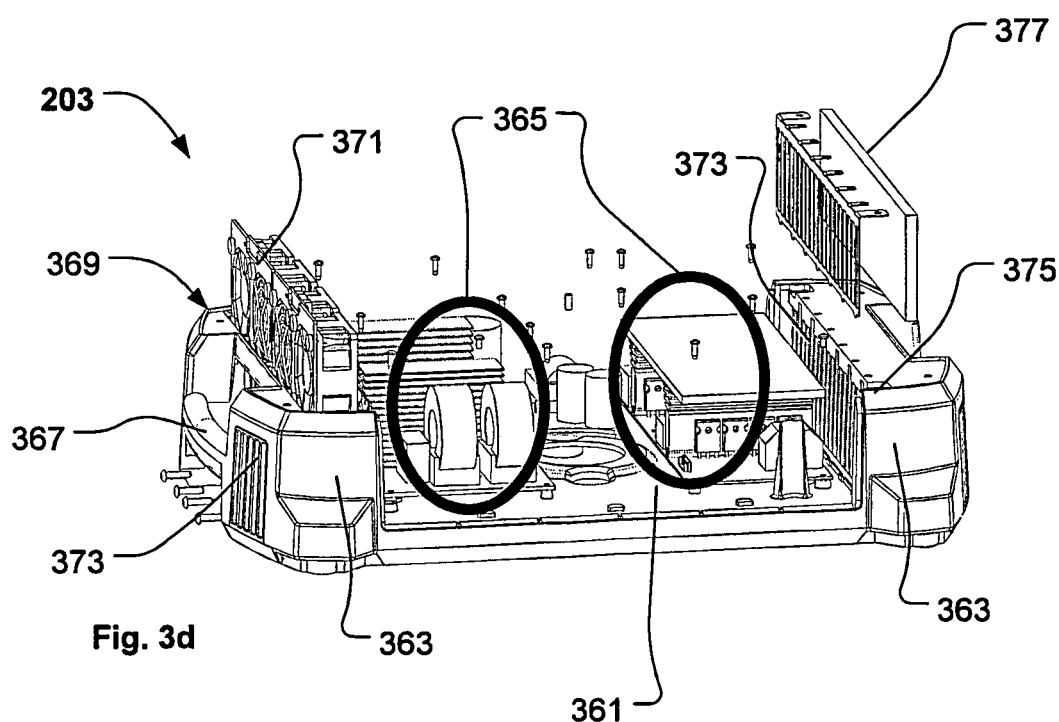

FIG. 3a-3d illustrates the base 203 of moving head light fixture in FIG. 2 and is embodied according to the present invention. FIG. 3a illustrates a front perspective view; FIG. 3b illustrates a front perspective and exploded view; FIG. 3c illustrates a second (different view angle) front perspective and exploded view and FIG. 3d illustrates a third (different view angle) front perspective and exploded view with the top plate remove.

The basic structure of the moving head light fixture is described in FIGS. 1 and 2 and the illustrated base 203 illustrates a possible embodiment the base. As described in connection with FIGS. 1 and 2 the base is rotatable connected to a yoke (not shown) through a base-yoke connection 357 enabling the yoke to rotate in relation to the base. The base 203 comprises a base element 359 comprising a mounting surface 361 and at least two edged sides 363 protruding outwards in relation to the mounting surface. In the illustrated embodiment the edged sides 363 protrude substantially perpendicular and upward in relation to the mounting surface (the skilled person realize that moving head light fixtures can be hung upside down in a truss system, but understands that the upward direction of the moving light head fixture refers the to the situation where the moving head stands on its base at the ground). A number of electronic components 365 (illustrated by circles) are arranged at the mounting surface 361. The electronic components 365 will not be described herein in details; however the electronic components may be any kind of components which can be used in a moving head light fixture. The base element is formed as one piece molded body, which compared to the known (known from small moving head base structures) bended pieces of metal makes it possible to provide a cheaper main construction for carrying the electric components. Another advantages achieved by molding the base element is that a single base element also can be used in large moving head light fixture, as the edged sides can be molded to have a larger crosses sectional dimension then the mounting side, which is not possible when using bended pieces of metal, where additional strengthening components need to be added in order to strengthen the edged sides.

Further a multiple number of additional "functions" can be molded into the mounting surface and side edges. These additional functions can for instance be handles 367 integrated into the side edges. The handles make it possible to carry the moving head light fixture and the manufacturing costs is reduced as these handles does not need to be mounted manual as known in the prior art. Further the side edges can comprise at least one cavity 369 wherein a number of components can be arranged. For instance in the illustrated embodiment a number of base blowers 371 are arranged in the cavities 369 and can thus force cooling air through the base. The side edge can also comprise a number of ventilation holes 373 where through cooling air can flow. Guides 375 for mounting air filters 377 can also be integrated into the side edges which again simplifies the manufacturing process. By providing the base element as a one piece molded body results thus in the fact the manufacturing cost is reduced as the molded body makes it possible to provide multiple functions into a one-piece component. Further by molding the base element makes it possible to provide a base element for large moving head light fixtures which does not need further strengthen material at the sides, as the edged sides can be provided with a larger cross sectional dimension that the mounting structure.

In the illustrated embodiment the base element is sandwiched between a cover plate 379 and a bottom plate 381 where the cover plate is arranged on top of the side edges 363 sides and where the bottom plate 381 is arranged at the bottom side of the mounting surface. This closes the compartment defined between the two edged sides and mounting surface and do also provide some strength the base. The rotatable base-yoke connection 357 means is secured to the bottom plate 381 and extends through an aperture in the base element 359 and top plate 374. Some of the forces applied when rotating the yoke is thus taken up by the bottom plate.

The base element comprises a recess delimited by the outer contour of the bottom side of the base element, and the bottom plate 381 is arranged in this recess. This provides a very esthetic looking base as the bottom plate can be hidden in the bottom side of the base element. The side plates serve to close the base entirely. Side plate 383a comprises also user interface means, DMX connectors, power connector and on/off switch as known in the art.

The electric components mounted at the mounting surface 361 are in electrical connection with the bottom plate and/or the cover plate. This makes it possible to ground the electric components whereby electromagnetic radiation can be reduced.

The base element 359 can be formed in in polymer whereby a very light structure can be provide. Alternatively the base element can be molded in metal which increase the base housing capacity of dissipating heat. The skilled person may provide the molded base element in any suitable material as desired and depending on weight requirement, cooling capacity etc.

Figure 4:
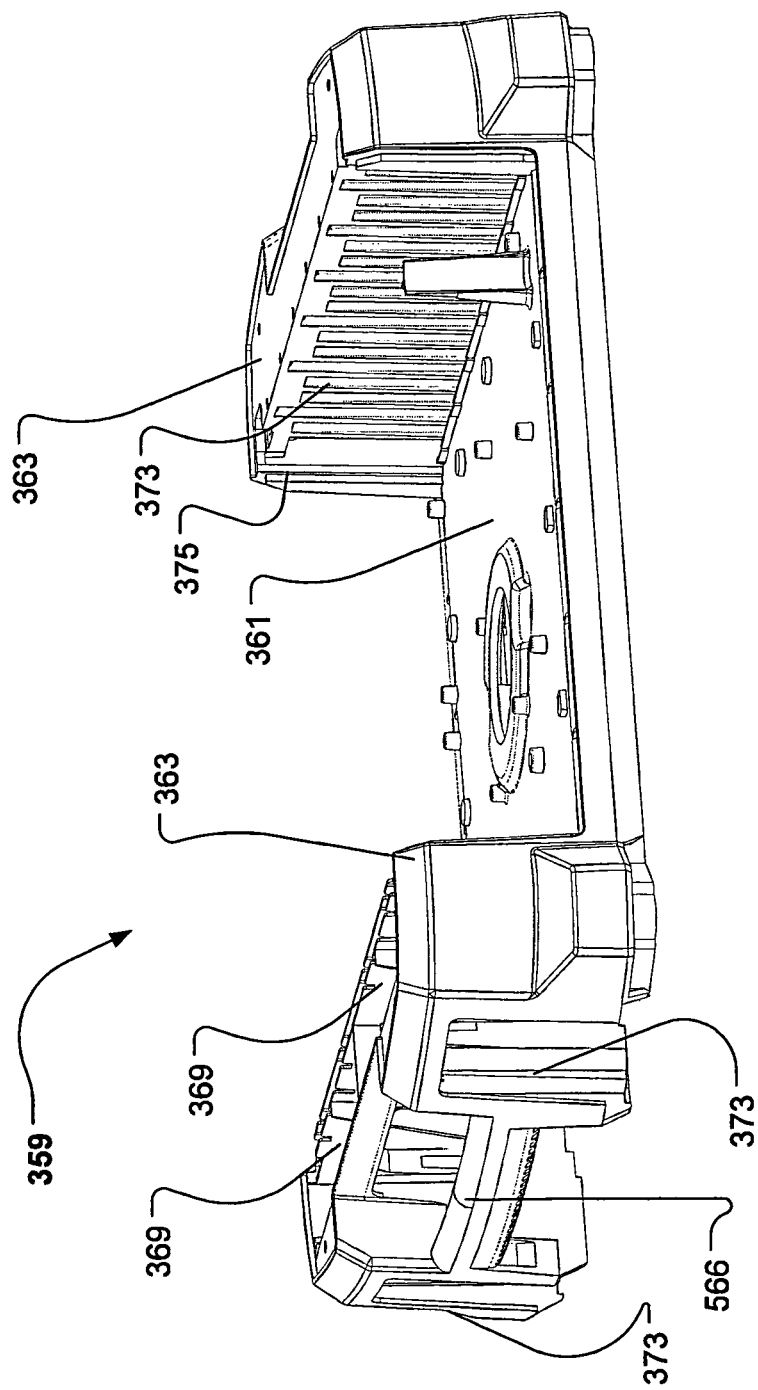
FIG. 4 illustrates a perspective view of a the base element formed as one piece molded body.

FIG. 4 illustrates a front perspective view of a one-piece base element 359 according to the present invention and the reference numbers is described in connection with FIG. 3a-3d.

Figure 5:
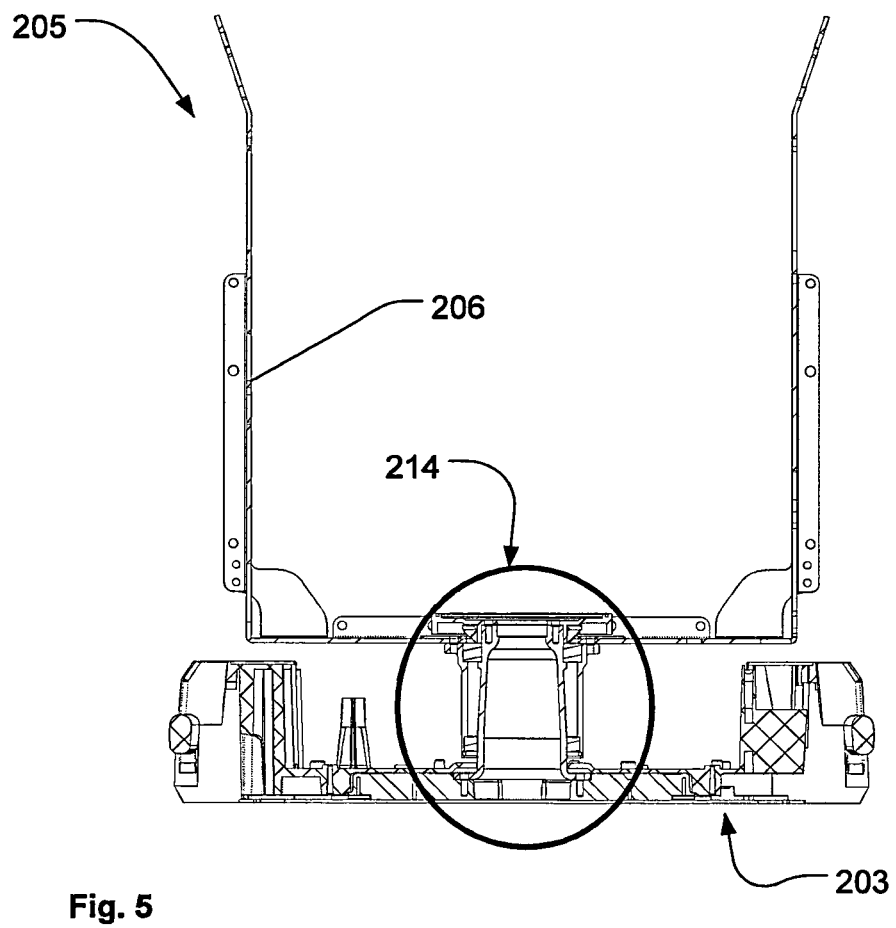
FIG. 5 illustrates basis components of a yoke and base of a moving head light fixture.

FIG. 5 illustrates a cross sectional of the basic components of the yoke 205 and the base 203 of the moving head light fixture illustrated in FIG. 2. In general moving head light fixtures the yoke 205 comprises some kind of yoke frame 206 which constitutes the basic structure of the yoke. The skilled person realizes that the yoke frame can comprise many different elements, be surrounding by one or more shell parts and be constructed in many different ways. In general the base 203 comprises a main compartment, where the base illustrated in FIG. 5 corresponds the base 203 illustrated in FIG. 3a-3d and FIG. 4. The base and yoke are rotatable connected to each other using a base-yoke connection (illustrated by circle 214) embodied according to the present invention and shown in FIG. 6a-6d and described below. It is to be understood that the base-yoke connection can be used to connect any king of yoke and base and is not limited to the embodiments of the yoke and/or base illustrated and described in this document.

Figure 6A:
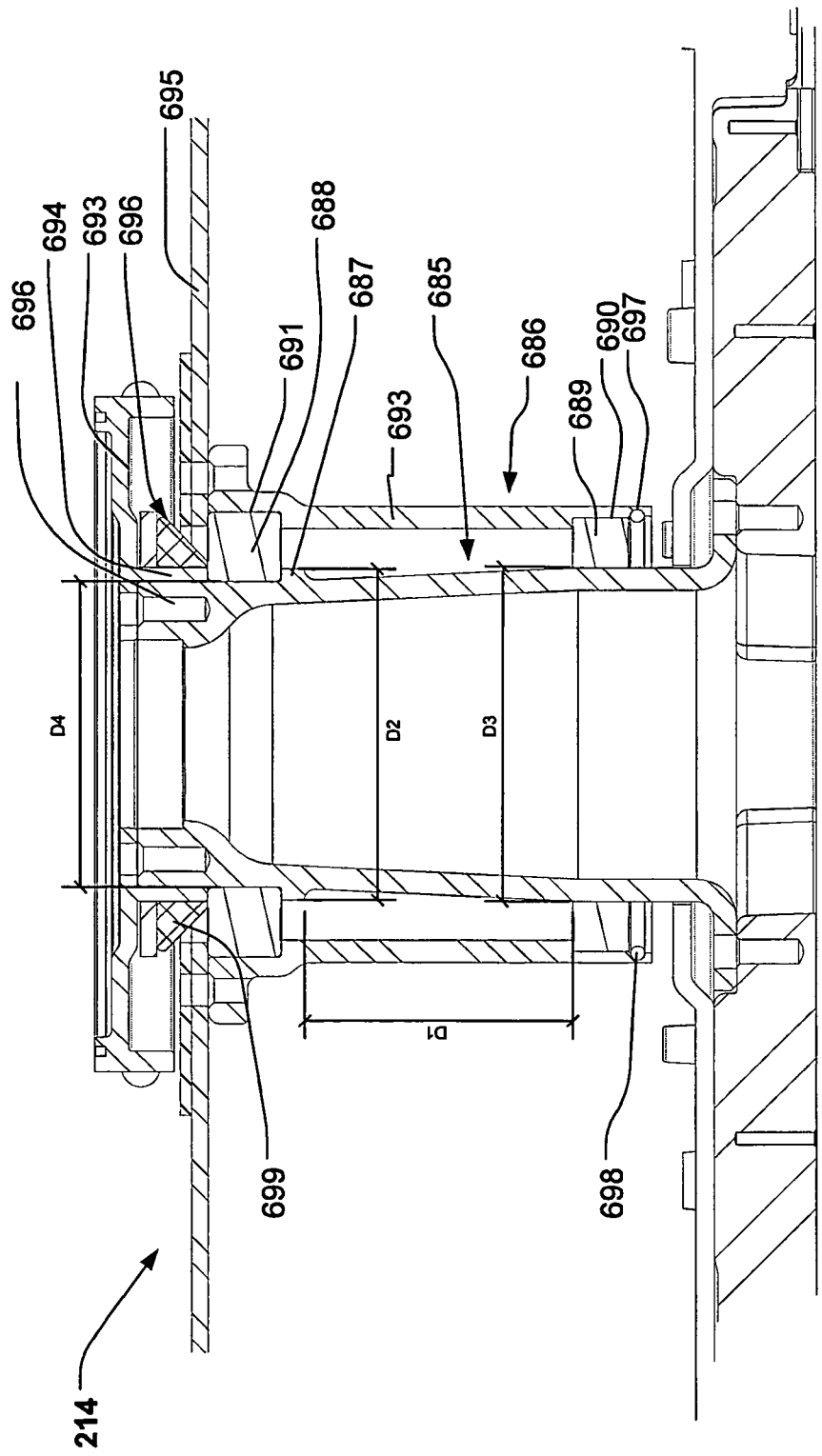
FIG. 6a-6d illustrates a base-yoke connection according to the present invention.
Figure 6B:
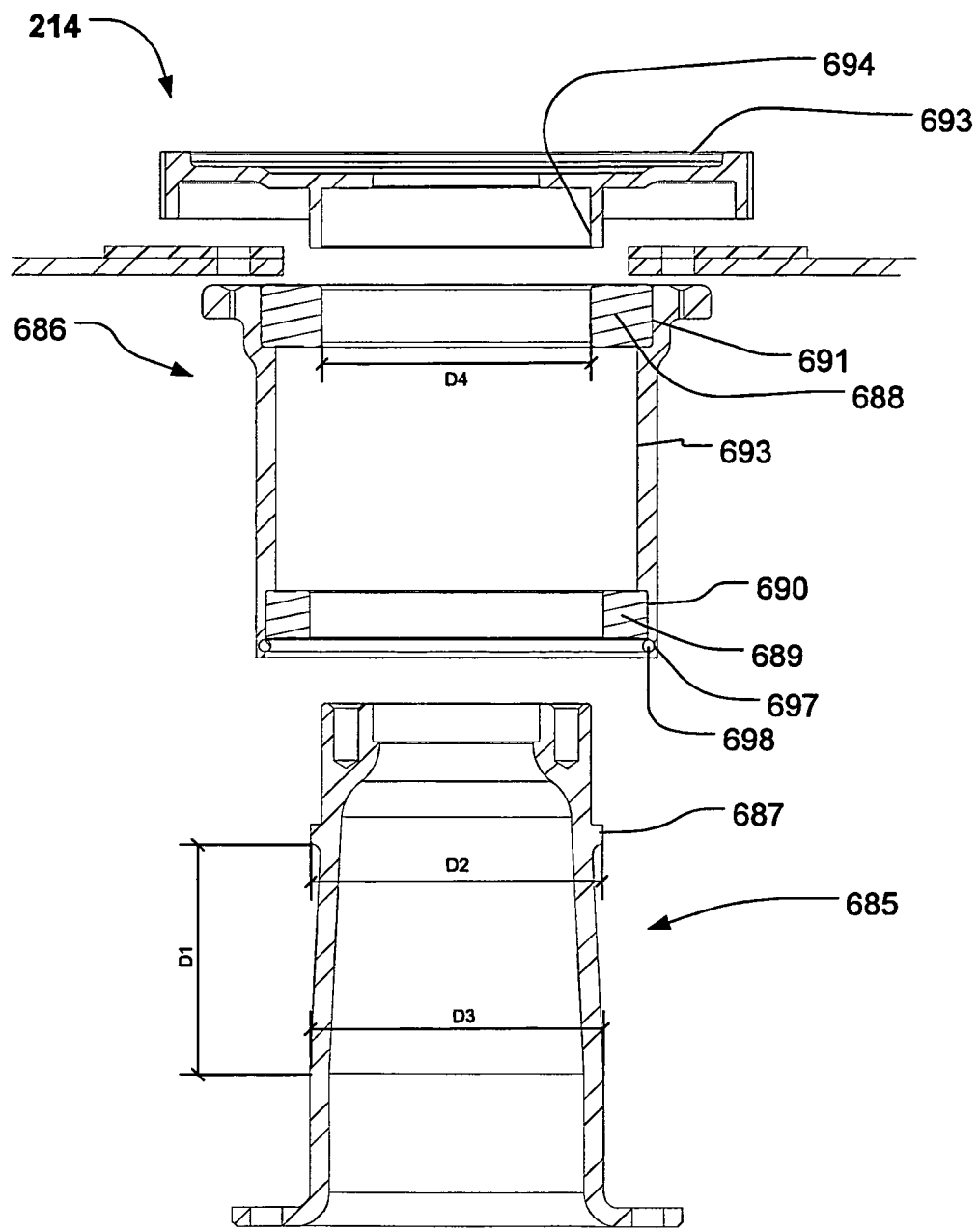
Figure 6C:
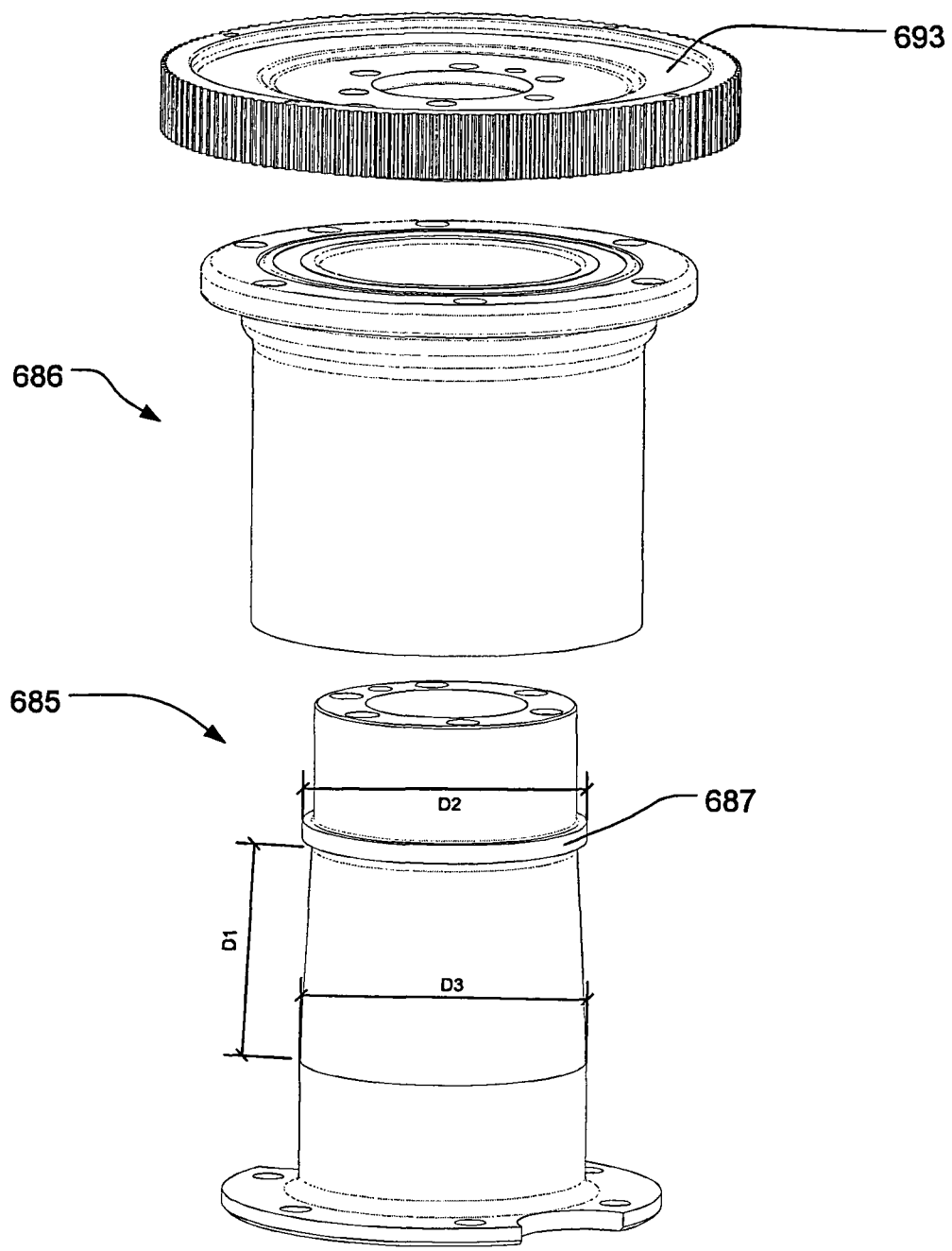
Figure 6D:
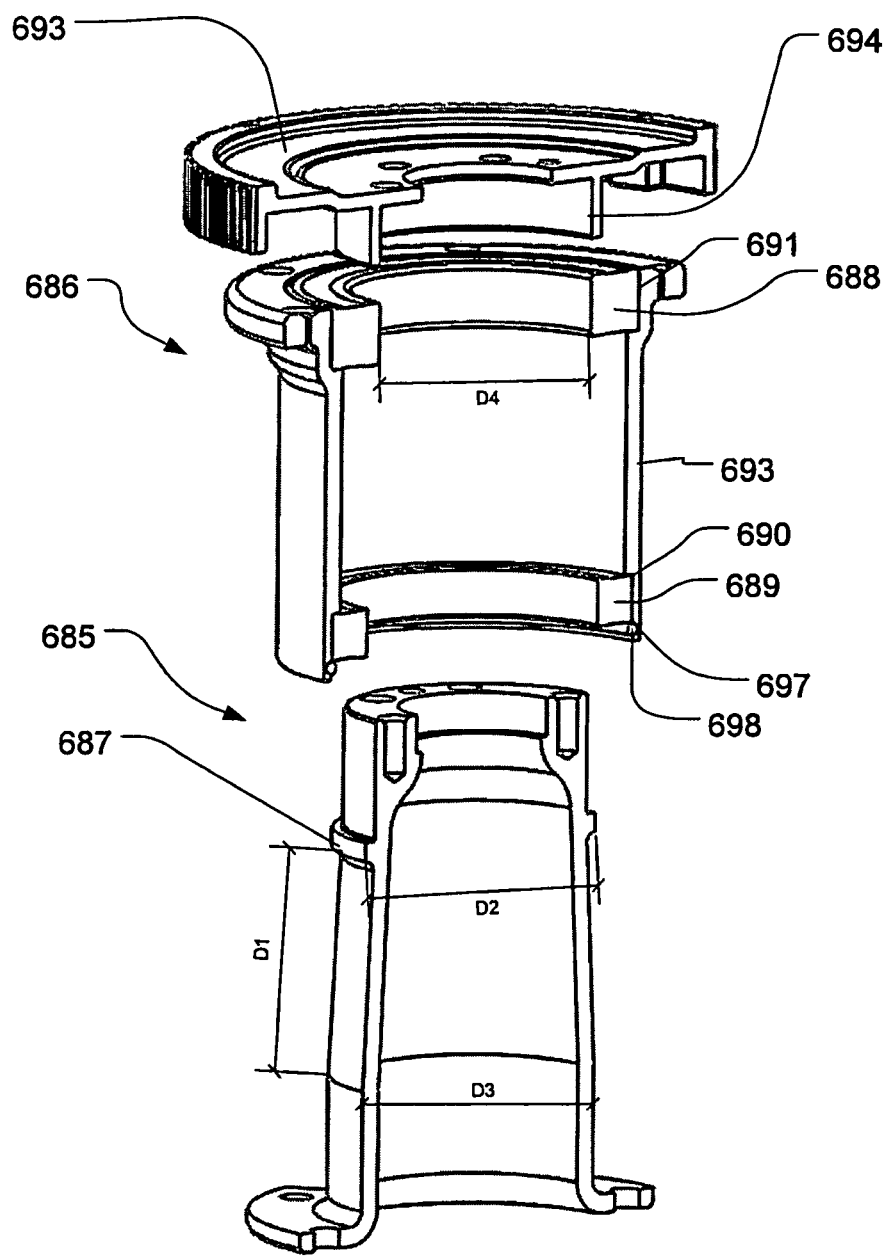

FIG. 6a-6d illustrates a base-yoke connection 214 according to the present invention and embodied in the moving head light fixture in FIG. 2. Where FIG. 6a is an enlarged cross sectional of the base-yoke connection illustrated in FIG. 5; FIG. 6b is an exploded cross sectional view of the base-yoke connection; FIG. 6c is an exploded perspective view of the base-yoke connection and FIG. 6d is an exploded perspective and partial cross section view.

The base-yoke mechanism comprises:
a main shaft 685;
a hollow shaft 686 surrounding the main shaft 685.

The main shaft has increasing cross sectional dimensions and comprises a first annular flange 687 located a distance D1 from the part of the main shaft having the largest cross sectional dimension D3. Further the cross sectional dimension D2 of the first annular flange 687 is smaller than the largest cross sectional dimension D3 of the main shaft. A first bearing 688 having a smaller inner cross sectional dimension D4 than the cross sectional dimension D2 of the first annular flange and is adapted to fit on the part of the main shaft besides the first annular flange 687.

A second bearing 689 is adapted to fit on the part of the main shaft having the largest cross sectional dimension D3 and has a larger inner dimension than the first annular flange D2. The second bearing can thus be arranged at the part of the main shaft 685 having the larges cross sectional dimension D3 from the top of the main shaft as it can be moved over the first annular flange 687.

The inner dimension of the hollow shaft 686 comprises a second recess 690 adapted to fit the outer dimension of the second bearing 689. The second recess comprises further a locking recess 697 wherein a resilient locking ring 698 can be arranged. The resilient locking ring 698 can thus secure the second bearing in the second recess of the hollow shaft.

Also the main shaft can comprise a second annular flange (not shown) located at the part of the main shaft having the largest cross sectional dimension than the larger cross sectional of the main shaft D3 and the second bearing can be adapted to be arranged beside and on the second annular flange.

The hollow shaft comprises also a first recess 691 adapted to fit the outer dimension of the first bearing 688.

The first 691 and the second recess 690 are separated by an intermediate part 693 having a smaller inner dimension than the recesses.

A first locking plate 693 comprises a hollow shaft part 694, where the hollow shaft part 694 is adapted to fit around the main shaft 685 and adapted to engage to inner part of the first bearing 688. The first locking plate comprises fastening means for fastening the first locking plate to the main shaft. The fastening means can for instance be screws, which engages threaded holes in the top of the main shaft. The inner part of the first bearing 688 is locked between the hollow shaft part 694 of the locking plate 693 and the first annular flange 687.

The base-yoke mechanism comprises also a second locking plate 695 comprising an aperture 696 wherein the hollow shaft part 694 of the locking plate and the main shaft can be positioned. The part of the second locking plate delimiting the aperture are adapted to engage with the outer part of the first bearing whereby the outer part of the first bearing 688 is locked between the second locking plate and the first recess 691 of the hollow shaft 686. Fastening means such as screws are used for fastening the second locking plate 695 to the hollow shaft 686 whereby the outer part of the first bearing 688 is locked between second locking plate and the first recess 691 of the hollow shaft 686.

In the illustrated embodiment the yoke is connected to the hollow shaft 686 and the main shaft 685 is connected to the base and the yoke can be rotated in relation to the base. This is achieved by the fact that the lower part of the yoke frame 206 shown in FIG. 5 constitutes the second locking plate 695. The bottom part of the main shaft is secured to the bottom part of the base 203 using fastenings means and the main shaft is thus fixed in relation to the base. The first locking plate 693 is further embodied as a driving wheel comprising a number of teeth which can engage with a drive belt 236 (illustrated in FIG. 2). As consequence the pan motor 235 can rotate the yoke around the driving wheel when activated.

However it is to be understood that the setup also can be mirrored meaning that the hollow shaft can be secured to the base and that the main shaft can be secured to the yoke.

In FIG. 6a is further illustrated a braking and damping mechanism 699 which is secure to the hollow shaft part and the first locking plate. The braking and damping mechanism serve to break and take op vibrations. In this embodiment the braking and damping mechanism is embodied in polymer.

The base-yoke connection provides an alternative and simpler base-yoke connection which is easier to manufacture than prior art base-yoke connections, which typically comprises are complicated to manufacture.

Figure 7:
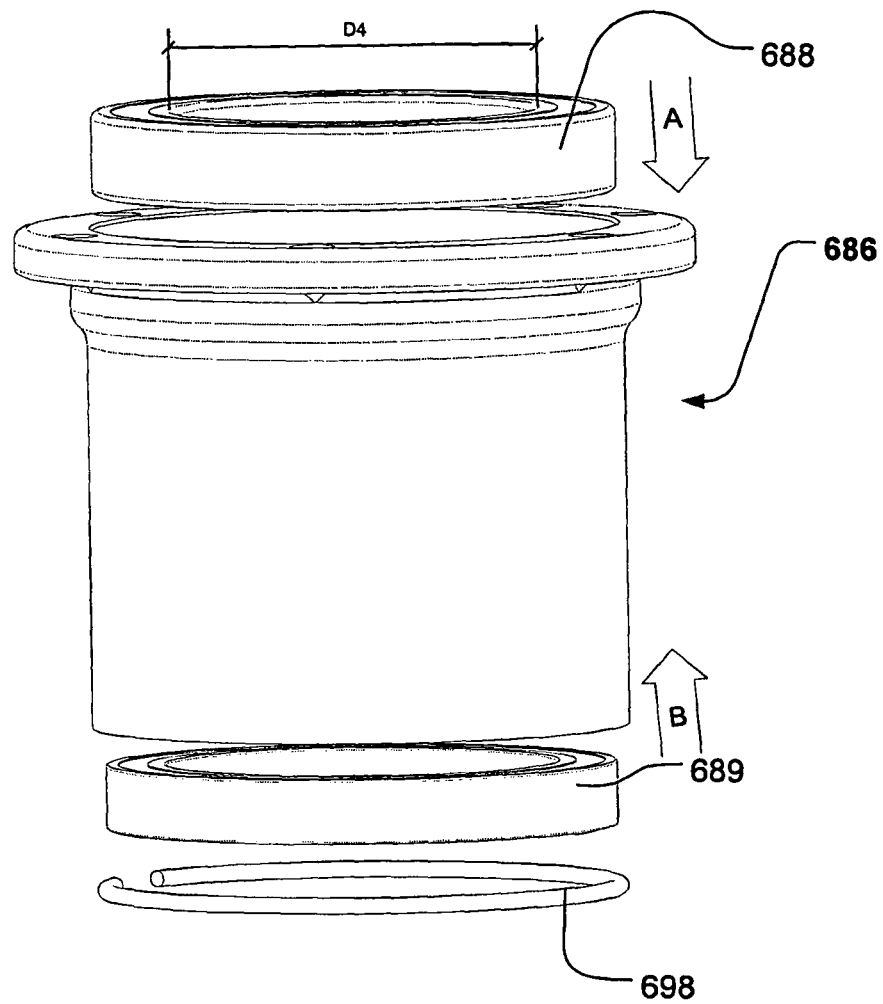
FIG. 7 illustrates an exploded perspective view of a hollow shaft of the base-yoke connection according to the present invention.

FIG. 7 illustrates an exploded view of the hollow shaft 686 of the base-yoke connection illustrated in FIG. 6a-6d. The first bearing 688 can be inserted into the first recess from of top of the hollow shaft 686 as illustrated by arrow A. The second bearing 689 can be inserted into the second recess from the bottom as illustrated by arrow B. The second bearing can be locked therein by inserting a resilient locking ring 698 into the locking recess of the second recess. Once the first and second bearings have been inserted into the hollow shaft it will appear as shown in FIG. 6c. The hollow shaft can then be arranged at the main shaft whereby the second bearing will slide over the first annular flange and be arranged at the part of the main shaft having the largest cross sectional dimension. At the same time the first bearing will be arranged at the first annular flange. Thereafter the second locking plate (the yoke frame) can be secured to the hollow shaft and the first locking plate 693 (the driving wheel) can be arranged to main haft as described above.

The main shaft can also comprise a second annular flange (not shown) located at the part of the main shaft having the largest cross sectional dimension and the second bearing can be adapted to be arranged beside and on the second annular flange. The base-yoke connection can be manufactured by firstly arranging the second bearing 689 at the second annular flange (not shown) and thereafter arrange the hollow shaft 686 arranged on top of the second bearing 689 such that the second bearing is situated in the second recess 690 and such that the intermediate part 693 rest on the outer part of the second bearing. Then the first bearing 688 is arranged at the first annular flange 687 and the top part of the intermediate part 819. The second locking plate 695 is then arranged on top of the outer part of the first bearing and fastened to the hollow shaft 686. The hollow shaft part of the first locking plate is then arranged on top inner part of the first bearing and secured to the main shaft. The main shaft and hollow shaft is thus rotatable connected through the first bearing, where the outer part of the first bearing have be tightened between the second locking plate and the hollow shaft and where the inner part of the first bearing have been tightened between the first locking plate and the main shaft.

The invention claimed is:

1. A moving head light fixture comprising:
    a base;
    a yoke connected to and rotatable relative to said base;
    a head connected to and rotatable relative to said yoke, said head comprising at least one light source generating light;
    wherein said yoke and said base are connected through a rotating base-yoke mechanism comprising:
    a main shaft;
    a hollow shaft surrounding said main shaft;
    at least one bearing separating said main shaft from said hollow shaft, allowing said main shaft and said hollow shaft to rotate in relation to each other;
    wherein the part of said main shaft surrounded by said hollow shaft has increasing cross sectional dimensions and comprises a first annular flange located a distance from a part of said main shaft having the largest cross sectional dimension,
    wherein the cross sectional dimension of said first annular flange is smaller than the largest cross sectional dimension of said main shaft.

2. The moving head light fixture according to claim 1 wherein said rotating base-yoke mechanism comprises a first bearing having a smaller inner cross sectional dimension than a cross sectional dimension of said first annular flange, the first bearing adapted to fit on the part of said main shaft besides said first annular flange.

3. The moving head light fixture according to claim 2 wherein said rotating base-yoke mechanism further comprises a second bearing adapted to fit on the part of said main shaft having the largest cross sectional dimension, the second bearing having a larger inner dimension than the cross sectional dimension of said first annular flange.

4. The moving head light fixture according to claim 3 wherein said hollow shaft comprises a first recess adapted to fit an outer dimension of said first bearing.

5. The moving head light fixture according to claim 4 wherein said hollow shaft comprises a second recess adapted to fit an outer dimension of the second bearing.

6. The moving head light fixture according to claim 5 wherein said first and said second recesses are separated by an intermediate part of said hollow shaft having a smaller inner dimension than that of said first and second recesses.

7. The moving head light fixture according to claim 5 wherein said rotating base-yoke mechanism comprises a first locking plate comprising a hollow shaft part, where the hollow shaft part fits around said main shaft, on a side of the first bearing opposite the first annular flange, the hollow shaft part adapted to engage an inner part of the first bearing.

8. The moving head light fixture according to claim 7 wherein said first locking plate comprises fastening means for fastening said first locking plate to said main shaft, whereby said inner part of said first bearing is locked between said hollow shaft part of said first locking plate and said first annular flange.

9. The moving head light fixture according to claim 7 wherein said rotating base-yoke mechanism comprises a second locking plate comprising an aperture, wherein a part of said first locking plate and said main shaft can be positioned; and where a part of the second locking plate delimiting said aperture engages an outer part of said first bearing, whereby said outer part of said first bearing is locked between said second locking plate and said first recess of said hollow shaft.

10. The moving head light fixture according to claim 9 wherein said second locking plate comprises fastening means for fastening said second locking plate to said hollow shaft whereby said outer part of said first bearing is locked between said second locking plate and said first recess of said hollow shaft.

11. The moving head light fixture according to claim 5 wherein said second recess of said hollow shaft comprises a locking recess adapted to accommodate a resilient locking ring, where said resilient locking ring is adapted to secure said second bearing in said second recess.

12. The moving head light fixture according to claim 1 wherein said main shaft comprises a second annular flange located at a part of said main shaft having the largest cross sectional dimension.

13. A moving head light fixture comprising:
a base;
a yoke connected to and rotatable relative to said base;
a head connected to and rotatable relative to said yoke, said head comprising at least one light source generating light;
wherein said yoke and said base are connected through a rotating base-yoke mechanism comprising:
a main shaft;
a hollow shaft surrounding said main shaft; and
at least one bearing separating said main shaft from said hollow shaft, allowing said main shaft and said hollow shaft to rotate in relation to each other;
wherein said main shaft has increasing cross sectional dimensions and comprises a first annular flange located a distance from a part of said main shaft having the largest cross sectional dimension,
wherein the cross sectional dimension of said first annular flange is smaller than the largest cross sectional dimension of said main shaft; and
wherein the rotating base-yoke mechanism further comprises a first locking plate having a hollow shaft part, where the hollow shaft part fits around said main shaft, has a cross sectional dimension smaller than any cross sectional dimension of the hollow shaft, and is adapted to engage an inner part of the bearing.

14. The moving head light fixture according to claim 13 wherein said first locking plate comprises fastening means for fastening said first locking plate to said main shaft, whereby an inner part of said at least one bearing is locked between said hollow shaft part of said first locking plate and said first annular flange.

15. The moving head light fixture according to claim 13 wherein said rotating base-yoke mechanism further comprises a second locking plate having an aperture, wherein a part of said first locking plate and said main shaft can be positioned, and where a part of the second locking plate delimiting said aperture engages an outer part of said at least one bearing, whereby said outer part of said at least one bearing is locked between said second locking plate and a recess of said hollow shaft.

16. The moving head light fixture according to claim 15 wherein said second locking plate further comprises fastening means for fastening said second locking plate to said hollow shaft, whereby said outer part of said at least one bearing is locked between said second locking plate and said recess of said hollow shaft.

17. A moving head light fixture comprising:
a base;
a yoke connected to and rotatable relative to said base;
a head connected to and rotatable relative to said yoke, said head comprising at least one light source generating light;
wherein said yoke and said base are connected through a rotating base-yoke mechanism comprising:
a main shaft;
a hollow shaft surrounding said main shaft, wherein at least a portion of said main shaft extends through and within said hollow shaft;
at least one bearing separating said main shaft from said hollow shaft, allowing said main shaft and said hollow shaft to rotate in relation to each other;
wherein said portion of said main shaft extending through and within said hollow shaft has increasing cross sectional dimensions and comprises a first annular flange.

18. The moving head light fixture according to claim 17 wherein said first annular flange is located a distance from a part of said portion of said main shaft extending through and within said hollow shaft having the largest cross sectional dimension, and wherein the cross sectional dimension of said first annular flange is smaller than the largest cross sectional dimension of said portion of said main shaft extending through and within said hollow shaft.

19. The moving head light fixture according to claim 18 wherein said rotating base-yoke mechanism further comprises a first bearing having a smaller inner cross sectional dimension than said cross sectional dimension of said first annular flange, the first bearing adapted to fit on the part of said main shaft besides said first annular flange.

20. The moving head light fixture according to claim 19 wherein said rotating base-yoke mechanism further comprises a second bearing adapted to fit on a part of said portion of said main shaft extending through and within said hollow shaft having the largest cross sectional dimension, the second bearing having a larger inner dimension than the cross sectional dimension of said first annular flange.

* * * * *